United States Patent [19]

Walters

[11] 4,155,900
[45] May 22, 1979

[54] FLAME RETARDANTS FOR SYNTHETIC RESINS

[75] Inventor: Harold C. Walters, Bartlesville, Okla.

[73] Assignee: Phillips Petroleum Company, Bartlesville, Okla.

[21] Appl. No.: 939,939

[22] Filed: Sep. 6, 1978

[51] Int. Cl.$^2$ ................................................ C08K 5/51
[52] U.S. Cl. .............................. 260/45.8 NT; 252/8.1; 260/45.9 NC; 260/45.9 KA
[58] Field of Search ............... 260/45.8 NT, 45.9 KA, 260/45.9 NC; 252/8.1

[56] References Cited

U.S. PATENT DOCUMENTS

| | | | |
|---|---|---|---|
| 3,284,216 | 11/1966 | Kaplan | 106/16 |
| 4,010,137 | 3/1977 | Brady | 260/45.8 |
| 4,026,810 | 5/1977 | Bost | 252/8.1 |

*Primary Examiner*—V. P. Hoke

[57] ABSTRACT

A phosphorus-containing flame retardant for synthetic resins is produced by (1) combining suitable amounts of at least one of certain phosphorus oxide compounds, at least one of certain nitrogenous compounds, and hydroxy compounds including dipentaerythritol and at least one hydroxy polyalkylene oxide having a molecular weight not greater than 800 and being selected from compounds having the formula, HO—(R—O)$_n$—H or HO—(R—O)$_m$—R' wherein R is an alkylene or cycloalkylene hydrocarbyl radical having 1 to 7 carbon atoms, n is 3 or greater, m is 2 or greater, and R' is a methyl or ethyl radical, wherein the amount of said at least one hydroxy polyalkylene oxide is no greater than about 30 weight percent of the total hydroxy compounds, and (2) heating the components under such conditions that the resulting product when incorporated into a synthetic resin will not cause significant foaming of the synthetic resin when it is subjected to molding conditions.

23 Claims, No Drawings

FLAME RETARDANTS FOR SYNTHETIC RESINS

This invention relates to a flame retardant. More particularly this invention relates to a phosphorus-containing flame retardant suitable for imparting flame resistance to synthetic resins.

Fire safety rules have increasingly affected the market for flammable plastics. Many plastics can be made flame retardant by incorporating therein a halogenated organic material which, on heating, produces an inert gas which dilutes the flammable gases produced by the heated polymer so that they are not within the combustible range. However, consumer alarm over the possible release of toxic gases during combustion of such flame-retarded plastics has spurred development of other non-halogenated flame retardant additives and flame retardant systems.

Recently some phosphorus-containing flame retardants have been developed as alternatives to the halogenated flame retardants. Disclosures of such flame retardants are contained in U.S. Pat. Nos. 4,010,137 and 4,026,810, the disclosures of which are incorporated herein by reference. Such phosphorus-containing flame retardants are prepared from a combination of several materials including certain phosphorus oxide compounds, certain nitrogenous compounds, and at least one saturated open-chain polyol containing from 5 to 15 carbon atoms and from 4 to 8 hydroxyl groups. In preparing those flame retardants the combination of materials is heated under such conditions that when the flame retardant is incorporated into a synthetic resin it will not cause significant foaming of the synthetic resin composition when the composition is subjected to temperature conditions such as those generally employed in molding the synthetic resin but will still impart flame resistance to the synthetic resin composition.

It has been discovered that when synthetic resins containing such flame retardants are exposed to conditions of high humidity the preferred flame retardants are those prepared employing dipentaerythritol as at least the major polyol of the polyols heretofore recognized as suitable. When dipentaerythritol is replaced by other of the polyols heretofore recognized as suitable, the synthetic resin compositions containing such flame retardants have a greater tendency to absorb water and become sticky when exposed to extremely high humidity. Aesthetically, of course, it is often undesirable to have synthetic resin products that are sticky. Also, the tendency of synthetic resin compositions to become sticky can have an undesirable effect upon the handling and processing of such compositions and the ultimate products.

Dipentaerythritol is unfortunately in relatively short supply. It is generally produced as a by-product from the synthesis of pentaerythritol. Accordingly, there is a need for the discovery of a material that can be used to replace at least part of the dipentaerythritol in such phosphorus-containing flame retardants and still give a product having comparable flame resistance and humidity resistance.

An object of the present invention is to allow one to replace part of the dipentaerythritol in such a flame retardant with another hydroxy compound and still obtain a flame retardant product having comparable flame resistance and humidity resistance.

Another object of the present invention is to provide flame resistant and humidity resistant synthetic resin compositions.

Other aspects, objects, and advantages of the present invention will be apparent from a study of this disclosure and the appended claims.

The objects of the present invention are provided by a phosphorus-containing flame retardant produced from reactants comprising suitable amounts of at least one of certain phosphorus oxide compounds, at least one of certain nitrogenous compounds, and hydroxy compounds including dipentaerythritol and at least one of certain hydroxy polyalkylene oxides. The reactants are combined and heated under conditions such that the flame retardant when incorporated into a synthetic resin will not cause significant foaming of the synthetic resin when it is subjected to molding conditions but will still impart flame resistance to the synthetic resin.

The phosphorus oxide, nitrogenous, and hydroxy compounds can be employed in any amounts that will result in a product having flame resistance. Generally, it is considered that flame resistance will be provided if 1 to 100 parts by weight of each of the three above-named types of reactants is employed. (All parts by weight being on the same weight basis).

The hydroxy polyalkylene oxide can be used to replace the dipentaerythritol in any amount no greater than about 30 weight percent of the total hydroxy compounds employed. Generally, it is preferred that the hydroxy polyalkylene oxide is employed in an amount in the range of about 20 to about 30 weight percent of the total hydroxy compounds.

The phosphorus oxide compounds employed in the instant invention have the formula $(P_2O_5)_{0.5-1.0}(H_2O)_{0.0-1.5}$ and include, for example, phosphorus pentoxide, orthophosphoric acid, and condensed phosphoric acids. In the most preferred embodiments anhydrous phosphorus pentoxide is employed. A condensed acid is a phosphoric acid containing any quantity of one or more polyphosphoric acids and/or metaphosphoric acids. Any such acid can be employed in this invention. The polyphosphoric acids include the dimeric pyrophosphoric acid and other entities such as the trimer through the nonamer and even more highly condensed species. The properties and compositions of the condensed phosphoric acids vary with the $P_2O_5$ content of the condensed phosphoric acid as discussed in Bell, "Composition of Strong Phosphoric Acids", *Industrial and Engineering Chemistry*, 40, 1464–1467 (1948). Although any condensed phosphoric acid having from about 70 to about 100 weight percent $P_2O_5$ can be employed; or, more preferably, when a condensed phosphoric acid is employed it contains about 80 to about 90 weight percent $P_2O_5$. Such condensed phosphoric acids may be prepared by any technique known by those skilled in this area.

The nitrogenous compounds employed in the instant invention include melamine, dicyandiamide, urea, and dimethylurea. The preferred nitrogenous material is melamine.

The hydroxy polyalkylene oxides suitable for use in the present invention are those having a molecular weight not greater than 800 which have the formula HO—(R—O)$_n$—H or HO—(R—O)$_m$—R' wherein R is an alkylene or cycloalkylene hydrocarbyl radical having 1 to 7 carbon atoms, n is 3 or greater, m is 2 or greater, and R' is a methyl or ethyl radical. Examples of such hydroxy polyalkylene oxides include, but are not limited to: triethylene glycol, tetramethylene glycol, pentamethylene glycol, tetraethylene glycol, tetrapropylene glycol, tetrabutylene glycol, pentaethylene glycol, pentapropylene glycol, pentabutylene glycol, hexamethylene glycol, hexaethylene glycol, polyethylene glycol, dimethylene glycol monomethyl ether, dimethylene glycol monoethyl ether, diethylene glycol monomethyl ether, diethylene glycol monoethyl ether, dipropylene glycol monoethyl ether, trimethylene glycol monomethyl ether, trimethylene glycol monoethyl ether, triethylene glycol monomethyl ether, triethylene glycol monoethyl ether, tetrapropylene glycol monomethyl ether, and polyethylene glycol monomethyl ether. Polyethylene glycols are commercially available from Union Carbide Corp. under the name Carbowax. The use of mixtures of such hydroxy alkylene oxide compounds is also within the scope of this invention.

It is also within the scope of the present invention to include in the preparation of the flame retardant other materials to improve its color, physical handling properties, and the like. If the synthetic resin to which the flame retardant is to be added is a color other than white coloring pigments are acceptable providing they do not have a significantly adverse effect upon the flame proofing properties of the flame retardant.

It is desirable for many applications that the flame retardant be as light in color as possible so as not to result in undesirably dark synthetic resin compositions. One technique employed to aid in obtaining light flame retardants is the incorporation of a small amount of a lightly colored pigment. Examples of such pigments include titanium dioxide, zinc oxide, calcium carbonate, clays, etc. The amount of pigment should generally be kept at a minimum since they generally have a deleterious effect on the performance of the flame retardant. When such pigments are included in the reaction mixture they are generally employed in an amount no greater than about 25 parts by weight per hundred parts by weight of reaction mixture, preferably about 1 to about 10 parts by weight per hundred parts by weight of the reaction mixture.

In general the heating required to produce the phosphorus-containing flame retardant will be conducted at a temperature in the range of about 100° C. to about 300° C. for about 1 to about 25 hours. The heating is contained for the length of time needed to obtain a product which when incorporated into a specific synthetic resin will not cause significant void formation, i.e. foaming and bubbling, when the synthetic resin is subjected to the temperatures generally used in processing and molding. The amount of heating required for a specific synthetic resin can be readily determined by routine experimentation. Of course, the heating is terminated at a point before the product is cured to a point that it loses its ability to perform as a flame retardant for a synthetic resin.

The reactants employed in preparing the flame retardant can be combined in any suitable manner. The reactants can be all reacted simultaneously. Preferably, the at least one phosphorus oxide compound is added to the admixture of a portion of the nitrogenous compound with the hydroxy compounds. As the temperature is raised then the remainder of the at least one nitrogenous compound is added. Preferably, whenever the temperature of the reaction is above room temperature, a nonoxidative atmosphere is employed.

In a preferred embodiment the flame retardant is prepared from the reactants set forth below with the parts by weight of each reactant employed in preparing the flame retardant per hundred parts by weight of the total reactants being set forth in the columns at the right:

|  | Broadly | Preferred |
| --- | --- | --- |
| phosphorus pentoxide | 10–75 | 15–50 |
| phosphorous acid | 0.5–25 | 1–15 |
| nitrogenous compounds | 10–70 | 15–50 |
| hydroxy compounds | 5–50 | 10–35. |

Examples of synthetic resins that can be rendered flame-retardant with the phosphorus-containing additives of this invention include olefin homopolymers, olefin copolymers, acrylonitrile-butadiene-styrene resins, and polystyrene resins, and blends thereof. The inventive flame retardants are particularly well suited for normally solid molding grade resins.

Examples of normally solid polyolefins suitable for use in this invention include polymers of mono-alpha-olefins having the general formula $CH_2=CHR''$ wherein $R''$ represents hydrogen or a hydrocarbyl radical, for example, an aryl radical or an alkyl radical or combinations thereof such as alkaryl and aralkyl, having up to a total of 10 carbon atoms in each $R''$ group. Typical polymers are the homopolymers and copolymers of ethylene. Such polymers can be prepared by any suitable process known in the art which produces a normally solid polyolefin. When propylene copolymers are used, such as propylene/ethylene copolymers, the ethylene comonomer is generally present in amounts ranging from about 2 to about 25 weight percent of said copolymer, and preferably the ethylene comonomer is present from about 5 to about 15 weight percent of said copolymer.

The cured (i.e. partially degassed) flame retardant of this invention can be added while still hot from its preparation to the synthetic resin and admixed therewith. Preferably, after the flame retardant is cooled it is ground or pulverized to a particle size suitable for incorporation into synthetic resins. The flame retardants can be incorporated into the synthetic resins using any convenient method which will distribute the flame retardant sufficiently uniformly throughout the resin to impart satisfactory flame resistance thereto. Preferably the flame retardant is reduced to a powder which will pass through an 80-mesh sieve. This can be accomplished by conventional milling procedures in which the flame retardant composition is milled into the resin at or above its softening or melting point, such as with conventional hot roll mills or heated internal mixers.

The amount of flame retardant additive prepared according to this invention that is employed to obtain satisfactory flame resistance can vary widely, depending upon the resin, the additive components, and the desired degree of flame retardancy. Generally, between about 10 and about 60 parts by weight of the flame retardant are employed per hundred parts by weight of synthetic resin, preferably about 20 to about 50 parts by weight of flame retardant per hundred parts by weight of synthetic resin.

Other conventional additives such as fillers, antioxidants, and the like can be incorporated into the synthetic resin along with the inventive flame retardant. Additionally, one can employ in conjunction with the inventive flame retardant other flame retardant compositions or flame retardant ajuncts, such as, antimony oxide, ethylene diamine dihydrobromide, and the like.

The following examples will further illustrate the invention.

EXAMPLE I

Preparation of Flame Retardants

The following example is typical of the method used to prepare the prior art phosphorus-containing flame retardants described in the present invention. To a 5 gallon stainless steel Baker-Perkins mixer equipped with sigma type blades, nitrogen cover plate and jacketed through which heated oil is circulated was charged at ambient room temperature 2 kilograms of melamine, 1.3 kilograms anhydrous phosphorus pentoxide, 1.7 kilograms dipentaerythritol, 0.2 kilograms titanium dioxide, and 0.075 kilograms phosphorous acid ($H_3PO_3$). A nitrogen atmosphere was kept over the contents during the subsequent mixing. After the ingredients were all added the mixer was turned on and heated oil was circulated through the mixer jacket. After about 8 minutes the temperature reached 260° C. The mixing was continued at 260° to 274° C. for 62 additional minutes. During the mixing the viscosity of the mix began to increase significantly as a result of a chemical reaction among the reactive ingredients (everthing except titanium dioxide). Because of this viscosity increase more power was required to maintain the same degree of mixing speed. After a total of about 70 minutes, the external heating and mixing was stopped and the contents allowed to cool to ambient room temperature. The contents were removed and stored in a covered plastic lined container. Approximately 4.84 kilograms (91% recovery) of an off-white colored product was obtained.

Employing the method described in Example I, flame-retardant formulations were prepared wherein various mono- and dihydroxy materials were used as partial replacements for dipentaerythritol. These formulations are shown in Table I.

EXAMPLE II

Flame Retardant Synthetic Resins

The following example represents a typical method of incorporating the flame retardant within a polymer. On a heated (121° C., 0.896 MPa, 130 psig steam) 3-inch diameter 2-roll mill was placed 35 grams of a mixture which contained 10.86 grams (45 parts per hundred polymer) of the flame retardant and 24.14 grams of polypropylene (polymer fluff from Phillips Petroleum Company) admixed for 5 minutes. The mix was stripped hot from the rolls, cooled and cut into strips about 1.27 cm (0.5 in.) wide×0.158 cm (0.0625 in.) thick×10.16 cm (4.0 in.) long. Several strips were laid in a mold (6.35 cm. 2.5 in.×12.7 cm. 5.0 in.×0.317 cm., 0.125 in.) and the mold with the strips placed between preheated platen plates for 5 minutes at 45.4 kg., 100 lbs. ram force while the temperature went from about 25° C. to 190.6±13.8° C. The heating of the sample was continued at 190.6±13.8° C. at 13,620 kg. (30,000 lbs.) ram force for an additional 5 minutes whereupon the newly molded slab sample was cooled to ambient room temperature under pressure and tested.

Each of the twelve flame retardants formulated as set forth in Table I were incorporated into individual batches of polypropylene using a technique such as just described. The resulting synthetic resin compositions were evaluated using the following tests.

1. UL-94

"Tests for Flammability of Plastic Materials. No. 3 Vertical Burning Test for Classifying Materials 94V-0, 94V-1, or 94-V2" This Underwriters Laboratories, Inc. test was modified such that only 3 samples were tested rather than the 5 specified Pass 2 is minimum for UL 94 V-0 rating. The number indicates the number of extinguishments within 5 seconds or less after ignitions of 10 seconds duration. Minus (−) indicates one or more samples burned more than 5 seconds or drop of molten mass for one or more specimen.

2. The ASTM D635-74

"Method for Flammability of Self-supporting Plastics". Numbers are the average number of seconds to extinguishment after two consecutive 30-second ignitions. Minus (−) indicates somewhat longer burn for second ignition.

3. Oxygen Index—ASTM D2863-74

Table I

| | Flame Retardants | | | | |
|---|---|---|---|---|---|
| Run | Weight Percent Ingredients in Reaction Mixture | | | | |
| No. | Hydroxy-Based Ingredient | DPE[a] | $P_2O_5$ | Melamine | $H_3PO_3$ | $TiO_2$ |
| 1 | Control (No additive) | 31.8 | 24.3 | 37.4 | 2.8 | 3.7 |
| 2 | 7.9 Pyrogallol | 23.8 | 24.3 | 37.4 | 2.8 | 3.7 |
| 3 | 7.9 Resorcinol | 23.8 | 24.3 | 37.4 | 2.8 | 3.7 |
| 4 | 34.0 Ethylene Glycol | — | 26.0[b] | 40.0 | — | — |
| 5 | 8.5 Ethylene Glycol | 25.5 | 26.0 | 40.0 | — | — |
| 6 | 8.5 Diethylene Glycol | 25.5 | 26.0 | 40.0 | — | — |
| 7 | 7.9 Triethylene Glycol | 23.8 | 24.3 | 37.4 | 2.8 | 3.7 |
| 8 | 7.9 Tetraethylene Glycol | 23.8 | 24.3 | 37.4 | 2.8 | 3.7 |
| 9 | 7.9 Polyethylene Glycol, 200[c] | 23.8 | 24.3 | 37.4 | 2.8 | 3.7 |
| 10 | 7.9 Polyethylene Glycol, 1000[d] | 23.8 | 24.3 | 37.4 | 2.8 | 3.7 |
| 11 | 7.9 Diethylene Glycol Monomethyl Ether[e] | 23.8 | 24.3 | 37.4 | 2.8 | 3.7 |
| 12 | 7.9 Diethylene Glycol Monoethyl ethyl Ether[f] | 23.8 | 24.3 | 37.4 | 2.8 | 3.7 |

[a]Dipentaerythritol
[b]As polyphosphoric acid
[c]Carbowax 200
[d]Carbowax 1000
[e]Diethylene glycol methyl ether (Methyl Carbitol*)
[f]Diethylene glycol ethyl ether (Carbitol*)
*Carbitol is a trademark of Union Carbide Corp.

This method determines the relative flammability of plastics by measuring the minimum concentration of oxygen in a flowing mixture of oxygen and nitrogen that will support flaming combustion.

4. Blend Stability

A molded slab (2 in.×½ in.×⅛ in.) of polypropylene composition prepared as described in Example II was placed in an oversized ⅛ in. thick metal mold such that a significant void space existed between the sides of the Brown colored samples are generally considered borderline.

Table II

| | | Properties of Polypropylene Compositions[a] | | | | | |
|---|---|---|---|---|---|---|---|
| Run No. | Added Hydroxy-Terminated Ingredient[b] | Blend Color | Blend Stability[c] | UL-94 Modified[d] | D635 Seconds[e] | Oxygen Index | Exposure to 95% Humidity[f] |
| 1 | Control (No additive) | Off white | S | Pass 4— | Pass 0 | 31.5 | D/NS |
| | | Lt. Tan | S | Pass 3 | Pass 0 | 32.8 | D/NS |
| 2 | Pyrogallol | Dk. Tan | S | Pass 2 | Fail | 28.3 | Sl. S |
| | | Brown | S | Pass 2— | Fail | 23.3 | D/NS |
| 3 | Resorcinol | Orange | S | Pass 4— | Pass 0— | 29.3 | Sl. S |
| | | Orange-Brn. | S | Pass 2— | Pass 5— | 23.8 | D/NS |
| 4 | Ethylene Glycol | Dk. Tan | U | Pass 2 | Pass 14— | 26.0 | W/S |
| | | k | U | Pass 2 | Pass 6— | 27.0 | W/S |
| 5 | Ethylene Glycol | Tan | U— | Pass 4 | Pass 0 | 27.1 | S |
| | | Lt. Brown | U— | Pass 4 | Pass 0 | 29.9 | S |
| 6 | Diethylene Glycol | Tan | U— | Pass 4 | Pass 0 | 29.6 S | |
| | | Lt. Brown | S— | Pass 4 | Pass 0— | 29.6 | Sl. S |
| 7 | Triethylene Glycol | Lt. Tan | S | Pass 4 | Pass 0 | 31.0 | D/Sl. S |
| | | Tan | S | Pass 4 | Pass 0 | 30.3 | D/Sl. S |
| 8 | Tetraethylene Glycol | V. Lt. Tan | S | Pass 3 | Pass 0 | 30.6 | S |
| | | Tan | S | Pass 4 | Pass 0 | 30.9 | D/NS |
| 9 | Polyethylene Glycol, 200[g] | Lt. Tan | S | Pass 4 | Pass 0 | 30.3 | S |
| | | Brown | S | Pass 4 | Pass 0 | 31.8 | D/NS |
| 10 | Polyethylene Glycol, 1000[h] | Lt. Tan | S | Pass 3— | Pass 2 | 27.4 | S |
| | | Brown | S | Pass 3 | Pass 2— | 28.6 | D/NS |
| 11 | Diethylene Glycol Monomethyl Ether | V. Lt. Tan | S | Pass 4 | Pass 2— | 32.0 | D/NS |
| | | Tan | S | Pass 4— | Pass 0— | 32.4 | D/NS |
| 12 | Diethylene Glycol Monoethyl Ether[j] | Lt. Tan | S | Pass 3 | Pass 0 | 33.0 | D/NS |
| | | Brown | S | Pass 4— | Pass 0 | 31.5 | D/NS |

[a]45 Parts flame retardant per 100 parts polypropylene fluff. Second line of data is for samples cured an additional 1.5 hours in oven at 260° C.
[b]Refer to Table I.
[c]Stable (S) indicates no bubbles after 15 mins. at 246° C.; unstable (U) indicates bubble formation.
[d]Modified indicates 3 samples tested rather than 5 specified. The number indicates the number of extinguishments within 5 seconds or less after ignitions of 10 seconds duration. Pass 2 is minimum for UL-94 V-O rating. Minus (—) indicates one or more samples burned more than 5 seconds or drop of molten mass for one or more specimen.
[e]Numbers are average number of seconds to extinguishment after 2 consecutive 30-seconds ignitions. Minus (—) indicates some-what longer burn for second ignition.
[f]D=dry, W=wet, M=moist, S=sticky, Sl. S=Slightly sticky, NS=not sticky after 48 hours.
[g]Carbowax 200, molecular weight 200
[h]Carbowax 1000, molecular weight 1000
[i]Methyl carbitol
[j]Carbitol
[k]No observation recorded.

mold and the test sample. The mold and test sample was then placed in a platen press under a slight pressure (<100 pounds ram force) and heated at 246° C. for 15 mins. The sample was then removed without cooling and any bubbles or signs of decomposition were visually observed. Stable (S) indicates no bubbles after 15 mins. at 246° C.; unstable (U) indicates bubble formation. A minus (—) after a U indicates that there was an extreme amount of void formation. A minus (—) after an S indicates that there was slight bubble formation.

5. 95% Humidity Exposure

Molded polypropylene composition samples (6.35 cm., 2.5 in.×12.7 cm., 5.0 in.×0.317 cm., 0.125 in.) were placed on a rack mounted in a covered desiccator that contained excess solid Na$_2$HPO$_4$.12 H$_2$O in a saturated aqueous solution of Na$_2$HPO$_4$.12 H$_2$O. This mixture at 20° C. gives an air environment of 95% humidity (Reference: "CRC Handbook of Chemistry and Physics", 50th Ed. pg. E-40). After 48 hours in said desiccator, the samples were removed and examined by finger touch. Samples were evaluated as follows: D is dry, W is wet, M is moist, S is sticky, Sl. S is slightly sticky, NS is not sticky.

6. Blend Color

After the propylene compositions were molded into bars as described in Example II and before further testing, the color of the samples were noted. An off white to tan color is generally desired. Samples darker than tan (e.g. dk brown to black) are thus generally unacceptable. Such darker compositions indicate decomposition or otherwise undesirable chemical reactions.

The inventive Runs 7, 8, 9, 11, and 12 when compared to Run 1 demonstrate that a portion (25 wt. %) of dipentaerythritol (DPE) of the prior art phosphorus-containing flame retardant can be replaced with the hydroxy compounds here disclosed without significantly altering the effect that the material has on the flame resistance of a synthetic resin. The inventive compositions having either tetraethylene glycol (Run 8) or polyethylene glycol 200 (Run 9) have slightly better resistance to flammability (UL-94 test) than the composition containing the prior art flame retardant. While Runs 8 and 9 may have slightly higher 95% humidity sensitivity than the control the sensitivity is still much less than that which results when other hydroxy compounds are used to replace the dipentaerythritol. The data also indicates that the slightly higher humidity sensitivity can be eliminated by curing the flame retardant longer at 260° C. The specificity of glycols from triethylene glycol to polyethylene glycol 200 is very apparent. Runs 5 and 6 illustrate that ethylene glycol and diethylene glycol are not satisfactory for replacing dipentaerythritol. They both result in unstable compositions with poor humidity resistance. Likewise, Run 10 employing polyethylene glycol 1000 also illustrates that the glycol is not suitable for replacing dipentaerythritol. It results in a composition providing much less flame resistance than the control. Runs 2 and 3 show that aromatic hydroxy compounds are not suitable for replacing dipentaerythritol. Both result in flame retardants which provide less flame resistance than the control.

From the foregoing description and examples, one skilled in the art can easily ascertain the essential characteristics of this invention and without departing from the spirit and the scope thereof, can make various changes and modifications of the invention to adapt it to various usages and conditions. Consequently, such changes and modifications are properly, equitably, and intended to be within the range of equivalence of the following claims.

I claim:

1. A phosphorus-containing flame retardant for synthetic resins comprising the product produced by combining reactants comprising 1–100 parts by weight of at least one phosphorus oxide compound of the formula $(P_2O_5)_{0.5-1.0}(H_2O)_{0.0-1.5}$; 1–100 parts by weight of at least one nitrogen compound selected from the group consisting of melamine, dicyandiamide, urea, and dimethylurea; and 1–100 parts by weight of hydroxy compounds including dipentaerythritol and at least one hydroxy polyalkylene oxide having a molecular weight not greater than 800 and being selected from compounds having the formula $HO—(R—O)_n—H$ or $HO—(R—O)_m—R'$ wherein R is an alkylene or cycloalkylene hydrocarbyl radical having 1 to 7 carbon atoms, n is 3 or greater, m is 2 or greater, and $R'$ is a methyl or ethyl radical, wherein the amount of said at least one hydroxy polyalkylene oxide is no greater than about 30 weight percent of the total hydroxy compounds, under suitable reaction conditions, said suitable conditions comprising employing amounts of said reactants suitable for yielding said phosphorus-containing flame retardant and heating said combined reactants such that said flame retardant when incorporated into a synthetic resin will not cause significant void formation in the synthetic resin when it is subjected to molding conditions but will still impart flame resistance to the synthetic resin composition.

2. A phosphorus-containing flame retardant according to claim 1 wherein the reactants comprise phosphorus pentoxide, phosphorous acid, said at least one nitrogenous compound, and said hydroxy compound and the parts by weight of said reactants per hundred parts by weight of the total reactants is as follows:

| | |
|---|---|
| phosphorus pentoxide | 10–75 |
| phosphorous acid | 0.5–25 |
| nitrogenous compound or compounds | 10–70 |
| hydroxy compounds | 5–50. |

3. A phosphorus-containing flame retardant according to claim 2 wherein said nitrogen compound is melamine.

4. A phosphorus-containing flame retardant according to claim 3 wherein said hydroxy polyalkylene oxide is selected from the group consisting of triethylene glycol, tetramethylene glycol, pentamethylene glycol, tetraethylene glycol, tetrapropylene glycol, tetrabutylene glycol, pentaethylene glycol, pentapropylene glycol, pentabutylene glycol, hexamethylene glycol, hexaethylene glycol, polyethylene glycol, dimethylene glycol monomethyl ether, dimethylene glycol monoethyl ether, diethylene glycol monomethyl ether, diethylene glycol monoethyl ether, dipropylene glycol monoethyl ether, trimethylene glycol monomethyl ether, trimethylene glycol monoethyl ether, triethylene glycol monomethyl ether, triethylene glycol monoethyl ether, tetrapropylene glycol monomethyl ether, and polyethylene glycol monomethyl ether.

5. A phosphorus-containing flame retardant according to claim 4 wherein said hydroxy polyalkylene oxide is selected from the group consisting of tetraethylene glycol, polyethylene glycol having a molecular weight of 200, diethylene glycol monomethyl ether, and diethylene glycol monoethyl ether.

6. A phosphorus-containing flame retardant according to claim 5 wherein said at least one hydroxy polyalkylene oxide is employed in an amount in the range of about 25 weight percent of the total weight of the hydroxy compounds.

7. A phosphorus-containing flame retardant according to claim 6 wherein the parts by weight of hydroxy compounds per hundred parts by weight of the reactants employed in making the flame retardant is about 33.

8. A phosphorus-containing flame retardant according to claim 6 wherein the parts by weight per hundred parts by weight of reactants is as follows:

| | |
|---|---|
| phosphorus pentoxide | 25 |
| phosphorous acid | 3 |
| melamine | 39 |
| hydroxy compounds | 33. |

9. A phosphorus-containing flame retardant according to claim 8 wherein the hydroxy compounds consist essentially of dipentaerythritol and tetraethylene glycol.

10. A phosphorus-containing flame retardant according to claim 8 wherein the hydroxy compounds consist essentially of dipentaerythritol and polyethylene glycol having a molecular weight of 200.

11. A phosphorus-containing flame retardant according to claim 8 wherein the hydroxy compounds consist essentially of dipentaerythritol and diethylene glycol monomethyl ether.

12. A phosphorus-containing flame retardant according to claim 8 wherein the hydroxy compounds consist essentially of dipentaerythritol and diethylene glycol monoethyl ether.

13. A flame-resistant synthetic resin composition comprising at least one synthetic resin and flame inhibiting amount of a phosphorus-containing flame retardant of claim 1.

14. A flame-resistant synthetic resin composition according to claim 13 wherein said composition contains about 10 to about 60 parts by weight of said phosphorus-containing flame retardant per 100 parts by weight of synthetic resin.

15. A flame-resistant synthetic resin composition according to claim 14 wherein said synthetic resin is selected from the group consisting of polyolefin homopolymers, polyolefin copolymers, acrylonitrile-butadiene-styrene polymer, and polystyrene.

16. A flame-resistant synthetic resin composition according to claim 15 wherein the synthetic resin consists essentially of one or more molding grade homopolymers or copolymers of mono-alpha-olefins having the general formula $CH_2=CHR''$ wherein $R''$ represents hydrogen or a hydrocarbyl radical having 1 to 10 carbon atoms.

17. A flame-resistant synthetic resin composition according to claim 16 wherein the synthetic resin is polypropylene.

18. A flame-resistant synthetic resin composition according to claim 17 wherein said at least one hydroxy polyalkylene oxide is employed in an amount in the range of about 1 to about 80 weight percent of the total weight of the hydroxy compounds.

19. A flame-resistant synthetic resin composition according to claim 18 wherein said reactants comprise phosphorus pentoxide, phosphorous acid, said at least one nitrogenous compound, and said hydroxy compounds and the parts by weight of said reactants per hundred parts by weight of the total reactants is as follows:

|  |  |
|---|---|
| phosphorus pentoxide | 10-75 |
| phosphorous acid | 0.5-25 |
| nitrogenous compound or compounds | 10-70 |
| hydroxy compounds | 5-50. |

|  |  |
|---|---|
| phosphorus pentoxide | 10-75 |
| phosphorous acid | 0.5-25 |
| nitrogenous compound or compounds | 10-70 |
| hydroxy compounds | 5-50. |

20. A flame-resistant synthetic resin composition according to claim 19 wherein said nitrogen compound is melamine.

21. A flame-resistant synthetic resin composition according to claim 20 wherein said hydroxy polyalkylene oxide is selected from the group consisting of tetraethylene glycol, polyethylene glycol having molecular weight of 200, diethylene glycol monomethyl ether, and diethylene glycol monoethyl ether.

22. A flame-resistant synthetic resin composition according to claim 21 wherein said at least one hydroxy polyalkylene oxide is employed in an amount in the range of about 20 to about 30 weight percent of the total weight of the hydroxy compounds.

23. A flame-resistant synthetic resin composition according to claim 22 containing about 30 to about 50 parts by weight of said phosphorus-containing flame retardant per 100 parts by weight of said synthetic resin.

* * * * *

UNITED STATES PATENT AND TRADEMARK OFFICE
CERTIFICATE OF CORRECTION

PATENT NO. : 4,155,900
DATED : May 22, 1979
INVENTOR(S) : Harold C. Walters

It is certified that error appears in the above-identified patent and that said Letters Patent are hereby corrected as shown below:

Column 9, line 41, "compound" (2nd occurrence) should be -- compounds --

Column 11, lines 21, 22 and 23 should be deleted.

Column 12, line 1 should be deleted.

Signed and Sealed this

Second Day of October 1979

[SEAL]

Attest:

RUTH C. MASON
Attesting Officer

LUTRELLE F. PARKER
Acting Commissioner of Patents and Trademarks